United States Patent [19]

Mignot et al.

[11] 4,110,786
[45] Aug. 29, 1978

[54] DEVICE GENERATING SPECIAL EFFECTS ON COLOR TELEVISION PICTURES

[75] Inventors: Lucien F. Mignot, St-Mande; Guy R. Macheboeuf, Vintry-sur-Seine, both of France

[73] Assignee: Telediffusion de France, Montrouge, France

[21] Appl. No.: 779,552

[22] Filed: Mar. 21, 1977

[30] Foreign Application Priority Data

Mar. 26, 1976 [FR] France .................. 76 08796

[51] Int. Cl.² ........................................... H04N 9/535
[52] U.S. Cl. ..................................................... 358/22
[58] Field of Search .................... 358/12, 14, 22, 183

[56] References Cited

U.S. PATENT DOCUMENTS 3,936,868   3/1976   Thorpe ................... 358/22

Primary Examiner—Robert L. Richardson

[57] ABSTRACT

A video tilting device for color television pictures wherein the color transmission system is of the SECAM, NTSC or PAL types in which the luninance signal and chrominance signal making up the composite video signal are separate signals. A part of the luminance signal spectrum Y is extracted from the input video signal having a chrominance subcarried S.P. carried through a single filtering step without modifying the composite input signal. Thus from the composite input video signal of luminance signal Y and chrominance signal S.P. (Y + S.P.) through a single filter, the subtraction of the amplitude of a direct predetermined luminance signal K from the amplitude of luminance signal Y provides a (Y-K) signal. This Y-K signal is then cut out by switching means at a reference voltage under the control of a switching signal representing those selected pictures for the tilting operation, and the aforesaid cut out signal is then subtracted from the input video signal (Y + S.P.). Whenever the switching signal selects the reference voltage, the output video signal is identical to the input video signal (Y + S.P.). Whenever the switching signal selects signal (Y-K), the output video signal transmits the special effects pictures with a predetermined luminance K and a chrominance equal to that corresponding to the composite input video signal.

5 Claims, 6 Drawing Figures

DEVICE GENERATING SPECIAL EFFECTS ON COLOR TELEVISION PICTURES

CROSS REFERENCES TO RELATED APPLICATIONS

Applicants hereby make cross references to their French Patent Application PV 76-08796, filed Mar. 26, 1976 and claim priority thereunder following the provisions of 35 U.S.C. 119.

BACKGROUND OF THE INVENTION

1. Field of the Invention

This invention relates to an electronic device for generating special effects on color television pictures by modifying the luminance signal of a video signal, and particularly for inserting titles on color television pictures. In the following description, by video signal is meant a coded color television signal comprising a known double logic and analog coding. The analog part transports the luminance and chrominance signals and the logic part transports the synchronization signals.

2. Description of the Prior Art

One of the related systems in the prior art is the SECAM color television process designed for the purpose of superposing the title pictures on color pictures; in this system the luminance signal and the chrominance signal making up the video signal are separate signals. The video signal is subjected to two different frequency filters in first and second parallel channels. The first low frequency filter extracts the low frequency luminance part transmitted by the first channel. A second filter complementary to the first extracts on the second channel all of the high frequency signals of the video signal surrounding the frequency spectrum of the chrominance signal. The luminance signal of the title pictures is then added to the luminance signal of the video signal. In this system, in order to avoid exceeding the amplitude of the separate luminance signal, a maximum value is required by video signal transmission and the luminance signal emitted from the preceding signal addition step must then be clipped. The chrominance subcarrier in parallel is then attenuated in the second channel. The luminance and chrominance signals respectively emitted from the outputs of the two parallel channels are then mixed in order to form the video signal to transmit the SECAM special effects titled color pictures.

Apart from the error introduced in clipping, this method entails possible errors in phasing of the luminance and chrominance signals. The composite output video signal is not substantially identical to the composite input video signal because precise complementarity of the low-pass and high-pass filters is particularly difficult to obtain.

Also, it is recognized that the amplitude of the video signal luminance signal which issues from the mixer of a color television studio sometimes exceeds the maximum permissible value $Y_M$, which is roughly equal to 0.7 V, corresponding to a maximum white picture.

In order to overcome these errors, the SECAM system devices limiting, at a predetermined nominal value the $Y_M$ of the white light corresponding to the amplitude of the luminance signal part having a frequency spectrum less than that of the chrominance signal, and devices to separate the input channel of the video signal in a main channel and filter channels which restore only the above-mentioned part of the luminance signal. These correcting devices are described in German Pat. Nos. 1,562,026 filed Feb. 15, 1968 and 2,048,045 filed Sept. 30, 1970.

Generally speaking, these devices comprise an input stage, a delay network inserted in the main channel which delays the input video signal for a duration which depends on the filtering and in the filtering channel according to the following order a low-pass filter connected to the output of the input stage as the delay network, the frequency spectrum of the output signal of the low-pass filter being the part of the luminance signal spectrum lower than the chrominance signal spectrum, an amplitude limiter or clipper at the nominal value of the white light, a phase inverter of 180° of the luminance signal and summation device operating as an adder whose inputs are connected to the outputs of the phase inverter and delay network. In this way, the adder tansmits the video signal limited to the nominal value of white light.

However, electronic devices of a known type inserted in the filtering channel and described in the above-mentioned patents, induce interference signals particularly in the chrominance signal frequency band thereby generating considerable disturbance during transmission of the output video signal. Also, these devices do not allow for easy use of the switching signal control when they are to be used for generating special effects on color television pictures.

OBJECTS OF THE INVENTION

It is an object of the present invention to provide video titling for color television pictures of the SECAM, NTSC or PAL color system types without separating the composite video signal and without clipping the luminance signal. This particularly means that the picture zone outside the title pictures transmitted correspond exactly to that issued from the input video signal.

It is also an object of the invention to provide an amplitude limiting device for a video signal of the SECAM, NTSC or PAL color system types eliminating the above-mentioned disadvantages inducing and generating interference in the chrominance signal band.

SUMMARY OF THE INVENTION

To achieve these objects, a device embodying the present invention for video titling for color television pictures is of same type as the amplitude limiting devices initially defined this improvement and which device comprises an input stage, a delay line and a low pass filter in the main channel to delay the input video signal for a time duration depending on the filtering characteristics of the low pass filter, these being connected to an amplitude limiter, a phase inverter for inverting by 180 degrees the luminance signal and a summation device or adder whose inputs are connected to the outputs of the phase inverter and delay line respectively. To this known device, with its known faults, is added a specific improvement for creating titling, is characterized in that it comprises a second summation device having a first input terminal which is fed with a determined luminance signal and a second input terminal connected to the output terminal of the low-pass filter, of the known system. A first switching means is provided having a first input terminal connected to the output terminal of the second summation device and having a second input terminal which second terminal is provided with a reference voltage, whereby the first input terminal and the second input terminal are each selectively placed under the control of a single determined switching signal, the first summation device which is part of the prior device, has a second input terminal connected to the output terminal of said first switching means and its output terminal transmits the corresponding video signal to the color pictures made up of color pictures having a part thereof with said determined luminance corresponding to the determined luminance signal fed to the first input terminal.

In accordance with the invention, the special titling effects on color television pictures are generated according to the process described hereinafter. The above-mentioned part of luminance signal Y is extracted from the input video signal having a chrominance subcarrier S.P. through a single filtering, without modifying the composite input video signal. The subtraction of amplitude of a direct predetermined luminance signal K to the amplitude of luminance signal Y puts out a signal (Y-K). The latter signal is out out by switching at a reference voltage under the control of a switching signal representing pictures for special effects, and is then subtracted from the video signal (Y + S.P.).

When the switching signal selects the reference voltage, the output video signal is identical to the input video signal (Y + S.P.). When the switching signal selects signal (Y-K), the output video signal transmits the special effects pictures with predetermined luminance K and a chrominance equal to that corresponding to the input video signal. This selection if formulated by the following equality between the alternative components of the above-mentioned signal:

$$Y = S.P. - (\frac{Y-K}{0}) = \frac{K}{Y} + S.P.$$

Also, limitation of luminance signal amplitude to a determined value $Y_M$ peak-to-peak is formulated by the preceding equality by substituting K for $Y_M$. In this case, the signal $(Y-Y_M)$ is cut out by switching with a reference voltage under control of a switching signal. The latter signal is issued from a comparator circuit of the amplitude of luminance signal Y issued from the output of the low-pass filter and amplitude $Y_M$ of a direct signal. When the amplitude of luminance signal Y is less than $Y_M$, the output video signal is identical to the input video signal. In the opposite, case, the output video signal is made up of a luminance video signal $Y_M$ and chrominance signal S.P. identical to that making up the input video signal.

BRIEF DESCRIPTION OF THE DRAWINGS

The above-mentioned objects and features of this invention will become apparent from the following specification taken in conjunction with the accompanying drawings wherein.

DESCRIPTION OF THE PREFERRED EMBODIMENTS

Figure 1:
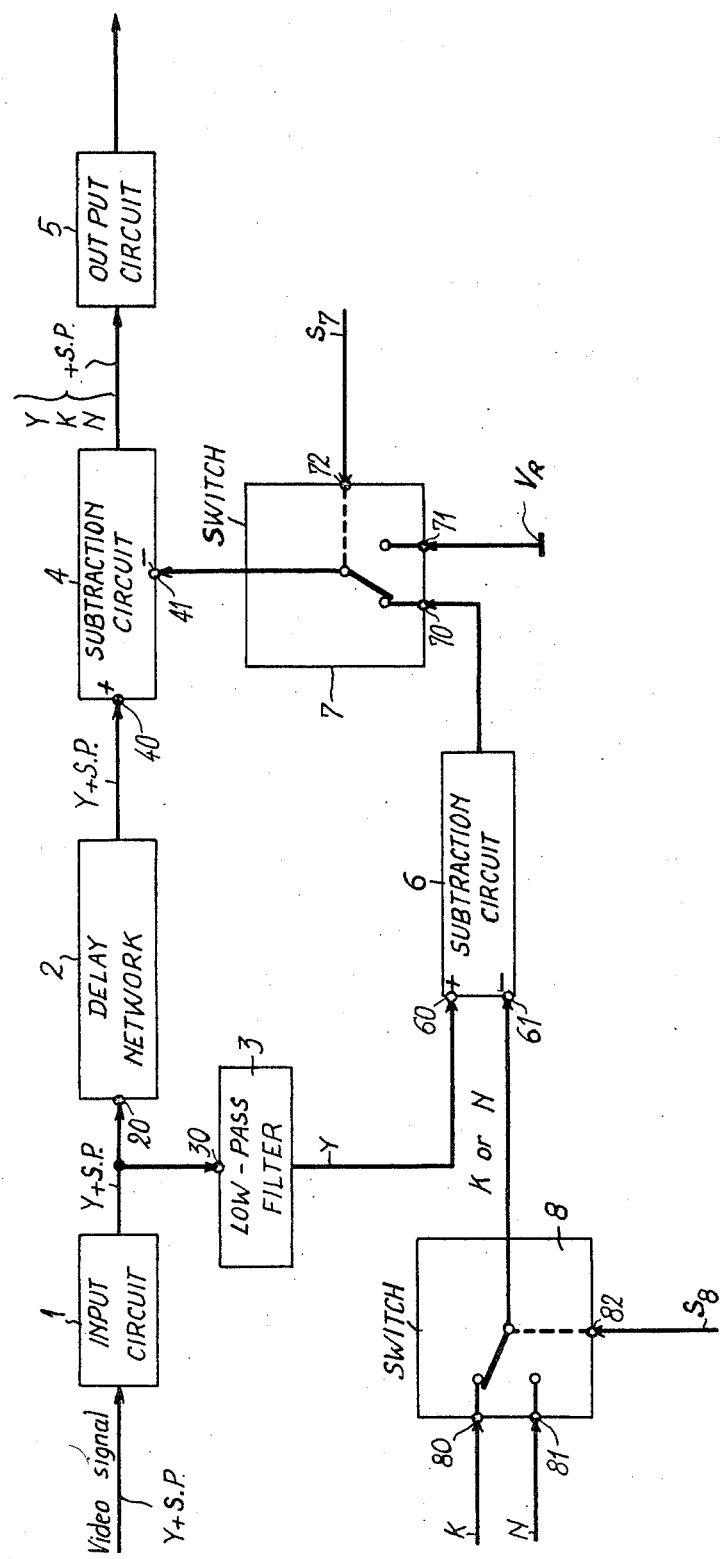
FIG. 1 is a block diagram illustrating a color television titler embodying the invention.

According to a first embodiment of the invention, in FIG. 1 is shown a device embodying the invention used for titling color television pictures. The composite input video signal comprising luminance signal Y and chrominance signal S.P., for example originating from a magnetoscope or from the mixer of a color television studio, is transmitted to an input stage 1. The chrominance signal S.P. is the subcarrier with amplitude or frequency or phase modulation in accordance with the known SECAM, N T S C and P A L color television processes. The output of input stage 1 analog to an impedance match circuit is connected to inputs 20 and 30 of a delay network 2 and a low-pass filter 3.

The output of the delay network 2 is connected to the positive input 40 of a subtractor 4 which is connected to the input of an output amplifier stage 5.

Under these conditions, the input video signal (Y + S.P.) which issues from the output of output stage 5 or of the picture titler is not modified with respect to the contents of the color television pictures.

The output of the low-pass filter 3 transmits the above-mentioned luminance signal part Y to the positive input 60 of a substractor 6. As is well known that the upper band of the frequency spectrum of luminance signal Y covers the frequency spectrum of the chrominance signal S.P. near the subcarrier frequency, luminance signal Y extracted from low-pass filter 3 consequently corresponds to the most significant low frequency band of signal Y.

According to a first example of a color picture titler embodying the invention, negative input 61 of subtractor 6 is fed with a predetermined amplitude constant luminance signal, K for example.

Consequently, the output of subtractor 6 generates an amplitude signal (Y-K). This output is connected to one of inputs 70 of a switch 7. The other input 71 of switch 7 is connected to a terminal with reference voltage $V_R$. This reference voltage $V_R$ is for example the average voltage of the input video signal. A switching signal $S_7$ in synchronization with the input video signals, by energizing the control input 72 of switch 7 signals the points of the picture of a title, for instance, issuing from a black and white slide. Signal $S_7$ selects one of the two inputs 70 and 71 of switch 7. A signal (Y-K) appears on the output of switch 7 connected to negative input 41 of subtractor 4 when the switching signal $S_7$ generates the picture of the title.

In the opposite case, switch 7 is connected to input terminal 71 at reference voltage $V_R$. Consequently, following the above-mentioned equality, the luminance signal Y issuing from the output of subtractor 4 is roughly equal to luminance signal K in the picture zone of the title and is not modified outside this zone. The constant amplitude of the luminance signal K is selected according to the desire of the user, for example, by means of a potentiometer, between the minimum voltage value $Y_m$ corresponding to a black colored picture and the maximum voltage value $Y_M$ corresponding to a white colored picture; generally, $Y_m$ and $Y_M$ are respectively equal to 0.1 V and 0.7 V.

According to a second example of a color picture titler embodying the invention, negative input 61 of subtractor 6 is connected to the output of a switch 8.

The two inputs 80 and 81 of switch 8 are respectively fed with predetermined luminance signal K and predetermined luminance signal N. A switching signal $S_8$ is emitted from the title picture and energizes the input of control 82 of switch 8 for selecting inputs 80 and 81. For example, the signal transmitted to the negative input 61 of substractor 6 is luminance signal K in the title zone and is luminance signal N outside this title zone.

According to this second example, switching signal $S_7$ is emitted from the picture of an outline surrounding the title zone. Consequantly, input 70 of switch 7 connected to the output subtractor 6 transmits to the negative input 41 of subtractor 4 signal (Y-K), or signal (Y-N) when signal $S_7$ signals the outline zone.

At the output of subtractor 4, the luminance signal of the composite video signal is the luminance signal K in zone common to title and outline and is the luminance signal N in the outline zone surrounding the title zone. Outside the outline zone, the luminance signal is luminance signal Y of the input video signal.

The picture generated by the video signal coming out of output stage 5 is then titled with a luminance title K surrounded by a luminance outline N. For example, by selecting N roughly equal to $Y_m$ and K roughly equal to $Y_M$, the title roughly colored by the initial non modified chrominance signal appears white on a black colored outline. This selection is made, as according to the first example, by means of two potentiometers assigned to luminance signals K and N respectively.

Figure 2A:
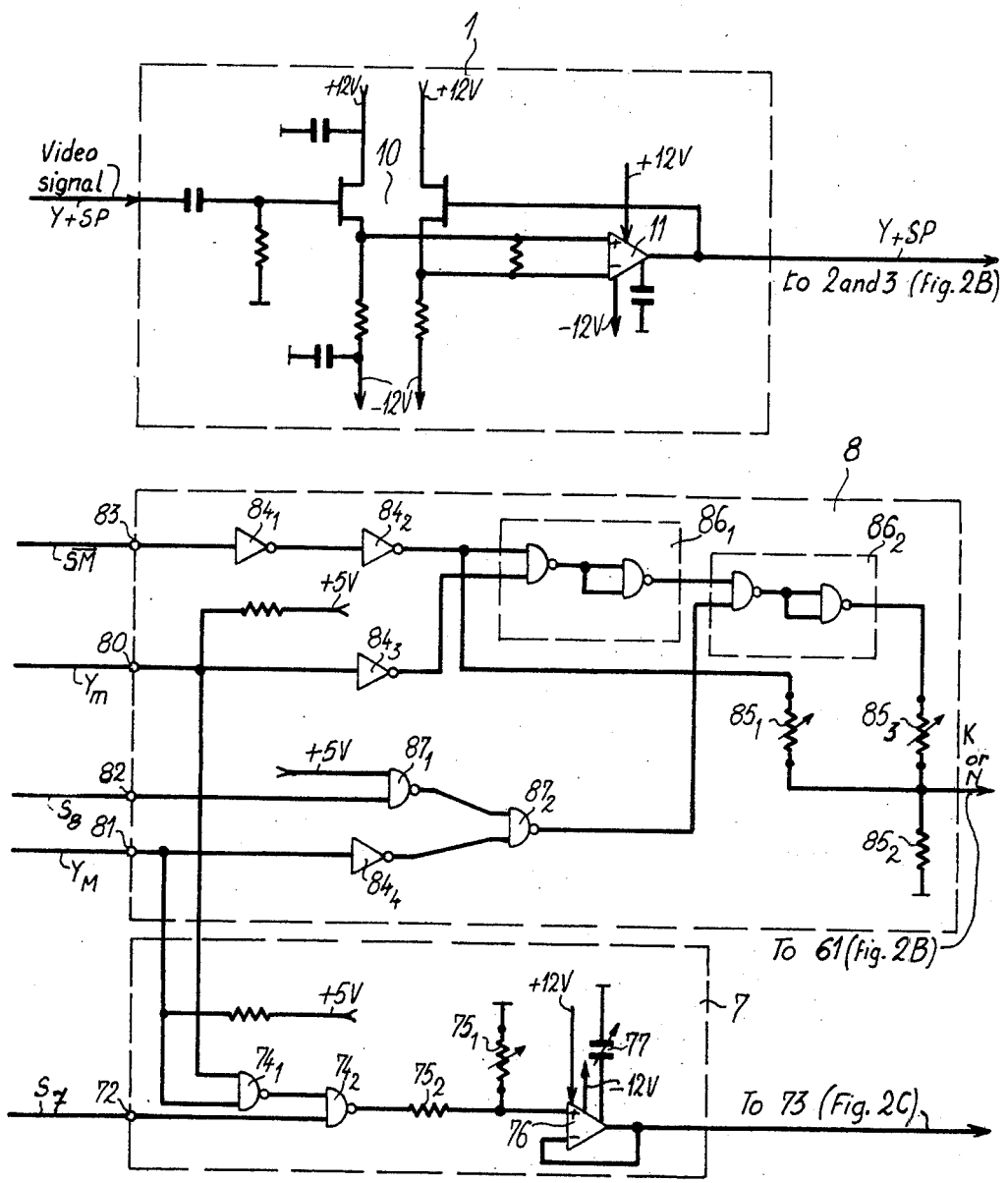
FIGS. 2A, 2B and 2C are partial schematic block diagram illustrating circuits making up the titler of FIG. 1.
Figure 2B:
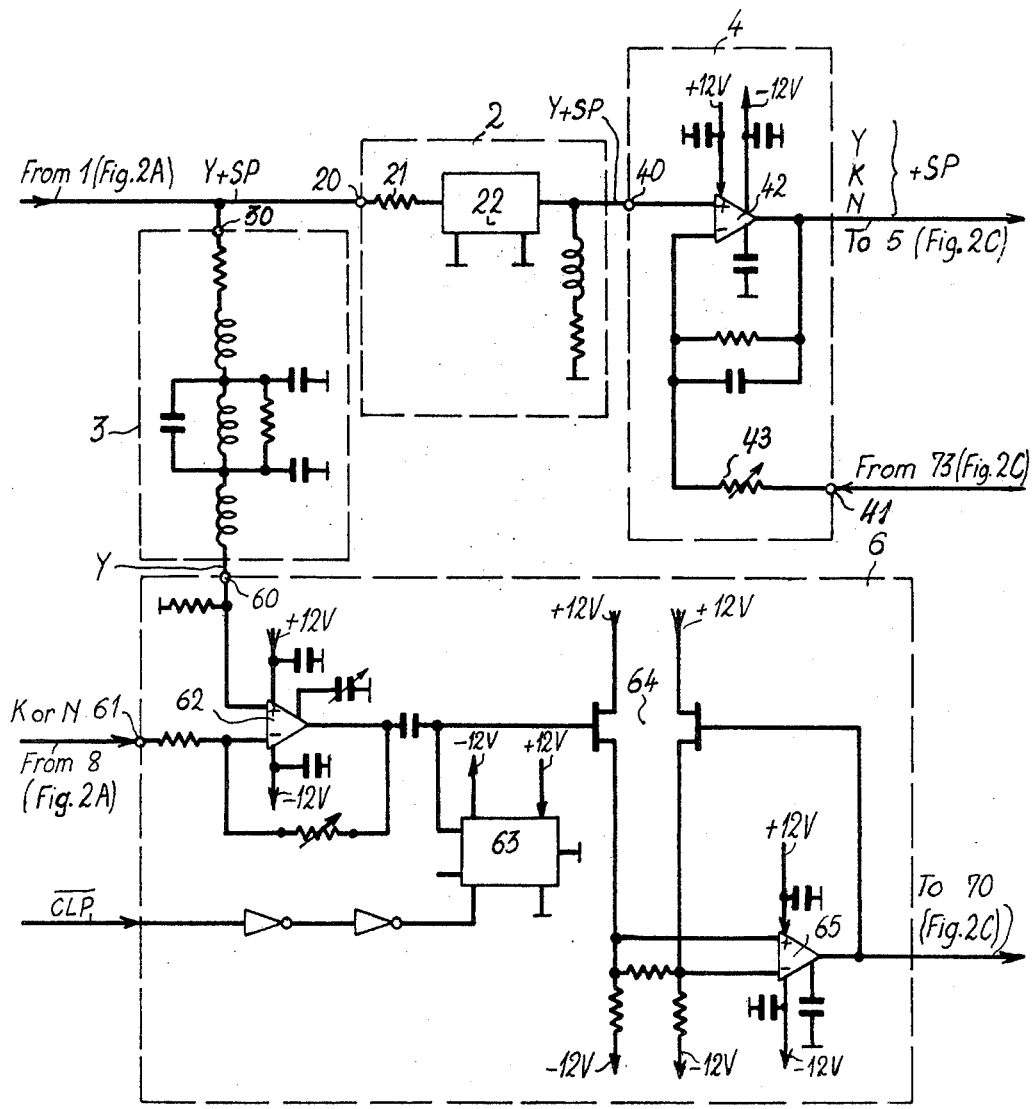
Figure 2C:
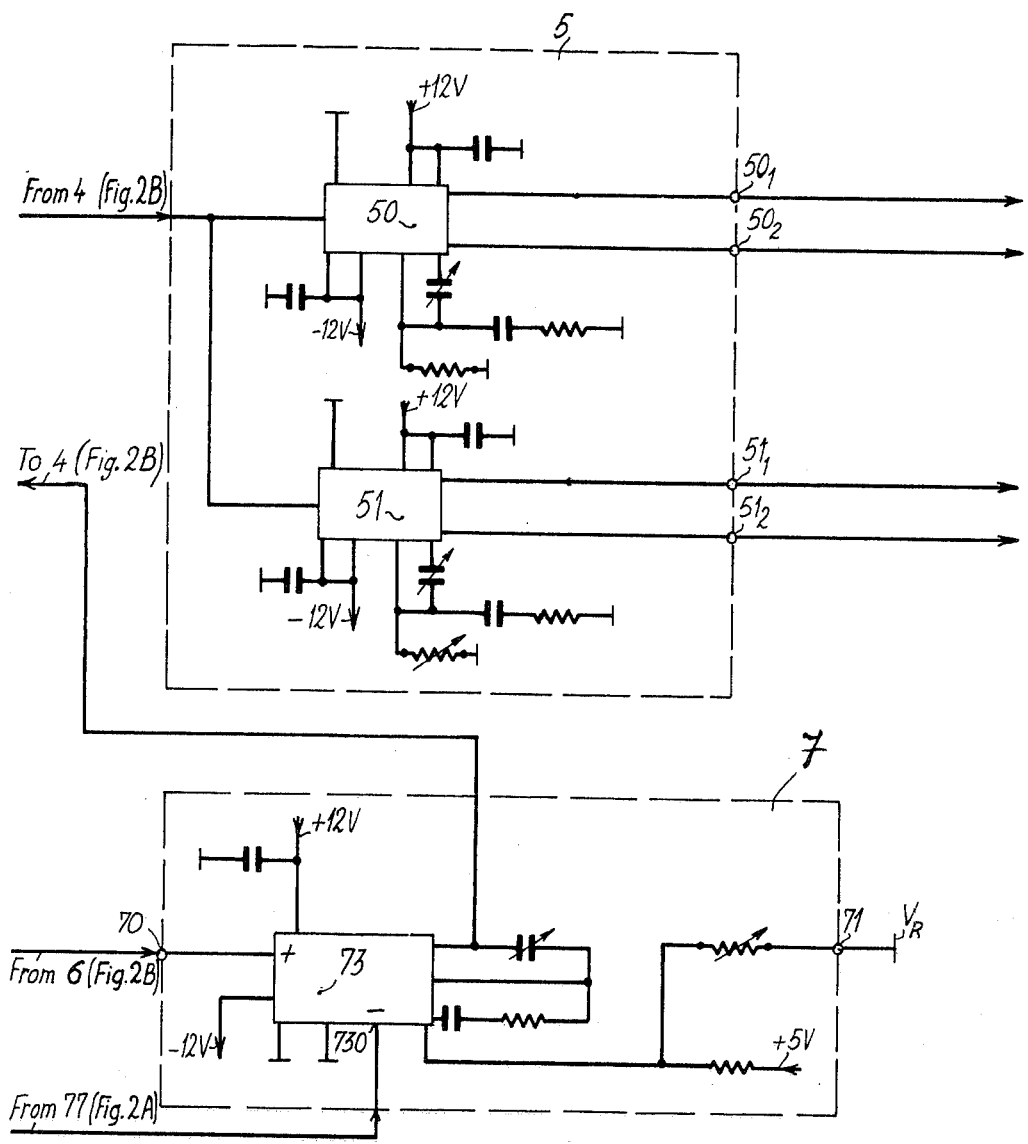

Referring now to FIGS. 2A, 2B and 2C which illustrate in detail the circuits of a color television titler embodying the second example of the invention, it is to be noted that some of the electronic circuits which are represented as blocks have structures analogous to the functional video circuits described in U.S. Pat. No. 3,681,619 filed on Feb. 4th, 1971.

The input of input stage 1 represented in FIG. 2A which is fed with composite video signal Y + S.P. can, if necessary, be terminated on a resistor (not shown), the value of which is adapted to the wiring of the device. Input stage 1 is mainly constituted by an impedance matching circuit characterized by a very high input impedance, a low output impedance and a gain which is roughly equal to the unity. In this respect, this impedance matching circuit comprises a circuit 10 with two field effect transistors and one operational amplifier 11 with output connected to the gate of the output field effect transistor of circuit 10.

Video signal Y + S.P. is then transmitted with no modification to inputs 20 and 30 of delay network 2 and low-pass filter 3 which are represented in FIG. 2B.

At input 20, the delay network 2 comprises a matched resistor 21 and a delay line 22. After input 30, the low-pass filter 3 is made up of a known circuit comprising resistors, inductors and capacitors whose cutout frequency is suitable for filtering the video signal and extracting from it the part of the luminance signal corresponding roughly to the lower frequencies of the chrominance signal spectrum.

The propagation delay time of the input video signal introduced by delay line 22 is selected equal to the duration of propagation of the luminance signal Y in the filtering channel comprising low-pass filter 3, substractor 6 and switch 7, in particular, this duration is dependent on the filter delay of the video signal in the low-pass filter 3. The preceding equality is required for ensuring a correct result for the subtraction Y−(Y−K) = K near the transitions of luminance signal Y of the video signal. Processing of the video signal in the titler embodying the invention introduces no error or change in the uniformity of the color pictures.

Figure 3:
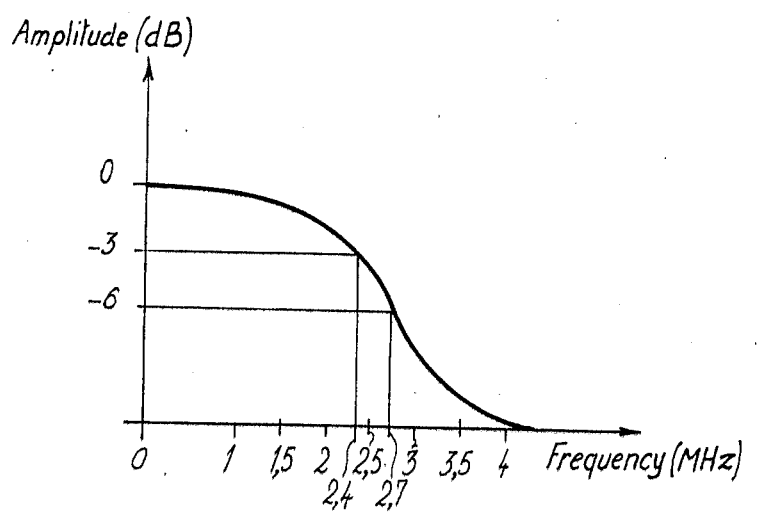
FIG. 3 is an amplitude-frequency curve of the low-pass filter represented in FIG. 2B.

By way of non-limiting example, delay line 22 introduces a delay time of 220 ns and the amplitude-frequency curve of low-pass filter 3 is that which is shown in FIG. 3.

The output of low-pass filter 3 transmitting the above-mentioned luminance signal part Y is connected to the positive input of an operational amplifier 62 which is integral with input terminal 60 of subtractor 6. The other positive input of amplifier 62 is integral with input terminal 61 and is fed with predetermined luminance signal K and/or N.

Referring now to FIG. 2A, switch 8 is fed through input 83 with logic signal $\overline{SM}$ for mixes suppression of video signal which, through two inverters $84_1$ and $84_2$ and an adjustable-voltage divider bridge formed by a potentiometer $85_1$ and a resistor $85_2$ generate luminance signal N with an amplitude $Y_m$ corresponding to a black image at approximately 100 mV. Through two logic circuits $86_1$ and $86_2$ which are connected in series to the output of inverter $84_2$, each one of which comprises a NAND-gate and an inverter, and through another adjustable voltage divider bridge made up by a potentiometer $85_3$ and the resistor $85_2$, the logic signal $\overline{SM}$ also generates a new additional luminance K which is added to minimum level $Y_m$ (or N) for obtaining a maximum level $Y_M$ corresponding to the white picture.

Inputs 80 and 81 of switch 8 are fed, according to this last example, with two logic luminance control signals $Y_m$ and $Y_m$, respectively. Input 82 transmits switching signal $S_8$ issuing from the title. Logic signal $Y_m$ is transmitted to a second input of logic circuit $86_1$ through an inverter $84_3$ while logic signals $S_8$ and $Y_m$ are transmitted to the second input of logic circuit $86_2$ respectively through a NAND-gate $87_1$ and an inverter $84_4$ connected to a NAND-gate $87_2$. Logic level $Y_M$ is used for forming white titles ($Y_M = 1$ and $Y_m = 0$) and is cut out by switching signal $S_8$ forming white titles underlined with black ($Y_M = 0$ and $Y_m = 0$). The below table shows the title picture obtained at the output of switch 8 connected to negative input 61 of subtractor 6 in accordance with signal levels $Y_M$ and $Y_m$ when potentiometers $85_1$ and $85_3$ are suitable adjusted.

| $Y_M$ | $Y_m$ | pictures corresponding to output signal of switch 8 |
|---|---|---|
| 1 | 1 | no title |
| 1 | 0 | white title |
| 0 | 1 | black title |
| 0 | 0 | white title underlined with black |

Subtractor 6 shown in FIG. 2B comprises an input operational amplifier 62 operated as a known subtractor with adjustable gain for compensating insertion losses due to low-pass filter 3. Its positive input 60 is connected to the output of low-pass filter 3 and its negative input 61 is connected to the output of switch 8 integral with that of resistor bridges $85_1$ to $85_3$. The output signal Y-K (or Y-N) of amplifier 62 is referred to the reference voltage or earth $V_R$ by means of circuit 63 controlled by reference signal at black level $\overline{CLP}$. Then a high impedance stage formed by circuit 64 with two field effect transistors and operational amplifier 65 suitably delivers signal (Y-K) or (Y-N) at input 70 of switch 7.

According to this example, switch 7 shown in FIGS. 2A and 2C comprises a variable gain amplifier 73 (FIG. 2C) analogous to video amplifiers described in above-mentioned U.S. Pat. No. 3,681,619. This variable gain amplifier provides the means for avoiding generation of interference signals with frequency spectra belonging to the frequency band alloted to the chrominance signal S.P. of the video signal.

The negative input 730 of amplifier 73 is fed by switching signal $S_7$ emitted from the picture of an outline and correctly shaped. Through a NAND-gate $74_1$ connected to the input terminals 80 and 81 of switch 8 transmitting logic signals $Y_m$ and $Y_M$ for stopping the titling signal ($Y_M=1$ and $Y_m=1$), and through another NAND-gate $74_2$ fed with the switching signal $S_7$ issuing from an outline and connected to the output of gate $74_1$, logic signal $S_7$ is shaped (FIG. 2A) by means of a logic levelling circuit 0 to 1 Volt made up of potentiometer $75_1$ and resistor $75_2$ and an adjustable scanning frequency circuit consisting of operational amplifier 76 and adjustable capacitor 77. Thus, when switching signal $S_7$ transmits an outline zone picture corresponding to logic lever 1 (0 volt) of the levelling circuit, the gain of amplifier 73 (FIG. 2C) is equal to the unity and input 70 transmits signal (Y-K) or (Y-N) to the negative input 41 of subtractor 4. In the opposite case, when switching signal $S_7$ corresponds to level 0 (1 Volt), i.e., zero gain of amplifier 73, reference voltage $V_R$ (or earth) is applied to input 41.

As an example, outline signal $S_7$ correctly shaped for controlling gain switching of amplifier 73 can provide quick gain variation between 0 and 1 with slope of 200 to 300 ns.

The output signal of switch 7 is subtracted from the video signal negative input 40 issuing from delay line 22 in subtractor 4 shown in FIG. 2B. Subtractor 4 comprises operational amplifier 42 operating as a subtractor whose potentiometer 43 of negative input 41 allows to compensate insertion losses in delay line 22 d to matching.

According to this example, output circuit 5 shown in FIG. 2C transmits the video signal by means of two amplifier stages 50 and 51 with two outputs $50_1$, $50_2$ and $51_1$, $51_2$.

According to other examples of the first embodiment of the invention, the device shown in FIG. 1 is used generally for generating special effects on color television pictures. The special effects are obtained by applying switching signals $S_7$ and/or $S_8$ emanating from combination, or addition of pictures selected for obtaining partial modification of the picture generated by the input video signal. In this case, switches 7 and 8 present several different luminance signal inputs which respectively are selected by control signals $S_7$ and $S_8$.

Figure 4:
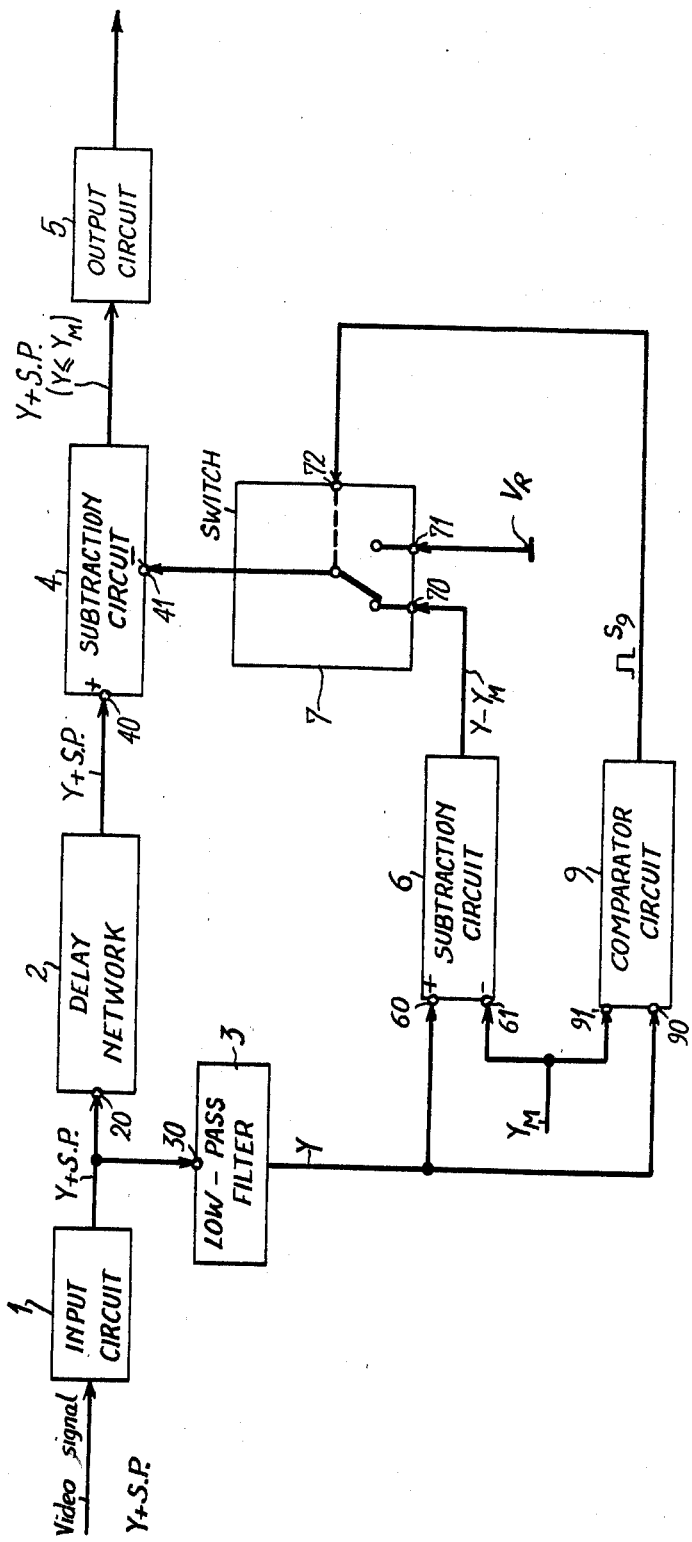
FIG. 4 is a block diagram illustrating an amplitude limitation device of the luminance signal of a color video signal embodying the invention.

With reference to FIG. 4, the block diagram shown in FIG. 1 has been modified in the channel comprising low-pass filter 3 for obtaining an amplitude limitation device of luminance signal Y embodying the present invention.

Negative input 61 of subtractor 6 is fed with direct amplitude signal $Y_M$ equal to value selected for limitation. For example, amplitude $Y_M$ is equal to maximum admissible value of 0.7 Volt. The output of low-pass filter 3 is connected as previously, to positive input 60 of subtractor 6 and also to one of inputs 90 of an amplitude comparator circuit 9. The other input 91 of comparator circuit 9 is fed with direct signal $Y_M$.

The amplitude comparator circuit 9 is adapted to generate a switching signal $S_9$ made up of gating pulses controlling switch 7. When the peak-to-peak amplitude of luminance signal Y is greater than $Y_M$, switch 7 is connected to the input 70 connected to the output of subtractor 6. This input is fed with amplitude signal ($Y-Y_M$). In the opposite case, the switch is connected to terminal 71 with reference voltage $V_R$.

Consequently, the luminance signal of the video signal issuing from the output of subtractor 4 always has an amplitude less or equal to $Y_M$. Amplitude limitation, corresponding to clipping of luminance signal Y, is obtained, in accordance with the invention, with no separation of the signals comprising the input video signal. This causes the uniformity of the color picture at the input of the device to be integrally transmitted to the output.

Switch 7 is of the type described in reference in FIGS. 2A and 2C comprises a variable gain amplifier included between 0 and unity and having a very low slope.

It is to be noted that in the above-mentioned systems, subtractors 4 and 6 are generally summation devices enabling transmission of the input video signal or video signal of a determined luminance. For instance, subtractor 4 can be an adder and also the input terminal of subtractor 6 are reversed with respect to the previously described examples.

What we claim is:

1. In a device for generating black and white titles on color television pictures transmitted by the SECAM type system using a composite video signal made up of a luminance signal and a chrominance signal in which an input stage, a delay network and a single low pass filter with input and output terminals are placed in the main video channel to delay the input video signal for a time duration depending upon the filtering characteristics of the low pass filter, said input stage, delay network and low pass filter being connected to a first summing means and a phase inverter for inverting by 180° the luminance signal with thhe input of the first summing means being connected to the output terminal of said delay line, that improvement comprising:

said input stage having its impedance matched to a single filter;

said low pass filter having its input terminals connected to the output terminals of said input stage and subtracting a constant amount from said luminance signal;

said inpedance matched input stage, delay network and filter providing an output signal from said low pass filter which is approximately the same in magnitude as the luminance signal of the chrominance subcarrier without requiring any modification of the composite input signal;

said first summing means having a first input terminal connected to the output terminal of said delay network;

a second summing means having a first input terminal which is supplied with a predetermined reference luminance signal at a reference voltage;

said second summing means having a second input terminal connected to the output terminal of said low pass filter;

a first switching means controlled by a predetermined switching signal having a first input terminal connected to the output terminal of said second summing means;

a source of reference voltage for said second summing means adjusted for cut off of said second input terminal connected to said reference voltage;

selecting means for selecting said reference voltage under the control of said predetermined switching signal;

said predetermined switching signal being emmitted from a titled picture under conditions where said predetermined luminance signal is a direct signal and said first summing means transmits said colored picture titled with said predetermined luminance;

a second switching means connected to said first input terminal of said second summing means; and said first summing means having a second input terminal connected to the output terminal of said first switching means and its output terminal transmitting said video signal corresponding to said color pictures wherein part of said picture is made up by color pictures having said predetermined luminance.

2. A device for generating special effects on color television pictures as claimed in claim 1 wherein the special effects are a limitation at a predetermined amplitude of the amplitude of the part of the luminance signal of the color television picture video signal emitted from the low-pass filter, said device including:

comparator means for comparing the amplitudes of said luminance signal part originating from said low-pass filter output with a direct signal from said predetermined amplitude, said comparator means including means for generating at its output said predetermined switching signal for controlling the selection of said input terminals of said second switching means;

said first input terminal of said second summing means being fed with said direct signal at said predetermined amplitude, and said first summing means transmitting said video signal being limited to said predetermined amplitude.

3. A device for generating special effects on color television pictures as claimed in claim 2 wherein said first switching means comprises a variable gain amplifier between a unit gain and a zero gain corresponding to said reference voltage.

4. A device for generating special effects on color television pictures as claimed in claim 3 wherein said first and second summing means are both subtractors.

5. A device for generating special effects on color television pictures as claimed in claim 3 wherein said first and second summing means are an adder and a subtractor respectively.

* * * * *